United States Patent [19]

White et al.

[11] 4,265,862

[45] May 5, 1981

[54] PROCESS FOR PURIFYING RARE-EARTH COMPOSITIONS USING FRACTIONAL SULFATE PRECIPITATION

[75] Inventors: Weimar W. White, East Rochester; Laurie A. Kimble, Hilton, both of N.Y.

[73] Assignee: Eastman Kodak Company, Rochester, N.Y.

[21] Appl. No.: 6,691

[22] Filed: Jan. 25, 1979

[51] Int. Cl.$^3$ .............................................. C01F 17/00
[52] U.S. Cl. ..................................... 423/21.1; 423/2; 423/3; 423/11; 423/14
[58] Field of Search ................... 423/2, 3, 11, 14, 21.1

[56] References Cited

U.S. PATENT DOCUMENTS

| | | | |
|---|---|---|---|
| 2,425,573 | 8/1947 | Soddy | 423/252 |
| 2,875,026 | 2/1959 | Duffield | 423/14 |
| 3,594,117 | 7/1971 | Chiola et al. | 423/21.1 |
| 3,896,045 | 7/1975 | Peeters et al. | 423/2 |
| 3,949,047 | 4/1976 | Cherdron et al. | 423/2 |

FOREIGN PATENT DOCUMENTS

| | | | |
|---|---|---|---|
| 866717 | 4/1961 | United Kingdom | 423/21 |
| 497238 | 4/1976 | U.S.S.R. | 423/21 |

OTHER PUBLICATIONS

Kotlyarov et al., Chem. Abs., 54, Abs. #'s 19256d & 19256h (1960).
Curie, J. Chim. Phys., 27, pp. 1-8 (1930).
McLane et al., "The Transuranium Elements", *National Nuclear Energy Series*, vol. 14B (1949) pp. 1371-1380.
Korkisch, "Modern Methods for the Separation of Rarer Metal Ions", pp. 189, 192, Pergamon Press (1969) Oxford.
Bailar et al., "Comprehensive Inorganic Chemistry", 4, pp. 46-58 & 66-67; & 5, pp. 9-10, 75, 276, Pergamon Press (1973) Oxford.

*Primary Examiner*—Edward A. Miller
*Attorney, Agent, or Firm*—J. Jeffrey Hawley

[57] ABSTRACT

A process is disclosed for purifying a composition comprising at least one rare-earth element. The process is useful for removing radioactive impurities from these elements. The process comprises the steps of:

(1) forming an aqueous solution of the composition to be purified having a pH between 4.0 and 6.5;
(2) precipitating a portion of the rare earth and the radioactive impurities by adding to the solution, while maintaining the pH between 4.0 and 6.5;
   (i) a soluble barium or strontium salt;
   (ii) a soluble aluminum, magnesium or zirconium salt;
   (iii) a selective precipitating agent; and
   (iv) a sulfate ion-providing salt.

The preferred selective precipitating agent is 8-hydroxyquinoline. After precipitation, the process is completed by the steps of:
(3) separating the solution from the precipitate and
(4) recovering purified rare earth from the solution.

The process produces highly purified rare earth which can be used to form phosphors for X-ray screens.

7 Claims, No Drawings

PROCESS FOR PURIFYING RARE-EARTH COMPOSITIONS USING FRACTIONAL SULFATE PRECIPITATION

BACKGROUND OF THE INVENTION

1. Field of the Invention

This invention relates to the purification of compositions containing rare-earth elements. More particularly, it relates to processes for removing trace quantities of radioactive impurities from compositions containing rare-earth elements.

2. Discussion Relative to the Prior Art

Phosphor materials comprising a rare-earth element as a host ion are well-known in the art. These phosphors are typically activated by the presence of minor amounts of other rare-earth elements. The rare earths are also referred to as lanthanides and are characterized by having an atomic number from 57-71 inclusive. Two rare earths, namely, lanthanum and gadolinium, are particularly useful as host ions in phosphor materials. An important use of these lanthanum and gadolinium rare-earth phosphor materials is in X-ray screens. A layer of the phosphor material serves to convert an X-ray image pattern into an image pattern which can be recorded on a photographic film positioned adjacent the X-ray screen. One particular phosphor material is lanthanum oxysulfide activated with terbium.

It has been observed that rare-earth phosphor materials may spontaneously emit radiation which can interfere with their use in X-ray screens. Because photographic film is sensitive to the unwanted spontaneous emissions of these phosphors, using these phosphors can result in the formation of undesired exposed areas which degrade the quality of the image. These undesired exposed areas take the form of high-density spots where the film is exposed to the spontaneously emitted radiation. The principal source of this spontaneously emitted radiation is radioactive impurities in the ore which is the source of the rare earth for the phosphor. The severity of the degradation is a function of the concentration of the radioactive impurities and the period of time for which the photographic film is in contact with the X-ray screen containing the impurity-laden phosphor.

Ores containing significant amounts of the rare-earth elements, such as monazite ore and bastnaesite ore, also typically contain radioactive elements such as uranium, actinium and the radioactive members of the uranium and actinium radioactive decay chains. Because uranium and most other radioactive impurities have differences in chemical properties distinct from the rare-earth elements, it is possible to separate readily most of these impurities from the rare earth. However, small amounts of radioactive impurities typically remain. The most difficult impurities to remove have proven to be actinium (227) and the members of its decay chain. This is because the chemical properties of actinium are very similar to the chemical properties of the rare-earth elements, particularly lanthanum. Therefore, chemical separation techniques which are adequate to separate other radioactive impurities, such as uranium, from the rare-earth elements, will typically not achieve satisfactory separation of actinium from the rare earths. In order to eliminate substantially the spotting problem discussed above, it has been found necessary to reduce the level of radioactive impurities in the rare-earth phosphor to less than 1 part in $10^{18}$. Prior-art methods for separating actinium from the rare earths, such as those discussed below, have proven to be inadequate to provide this level of purity.

Several methods have been devised for obtaining separations of actinium from the rare earths. In one of the earliest attempts, a material enriched in actinium was obtained by a process including fractional precipitation of lanthanum from solution, using oxalic acid. The unprecipitated material was reported to have shown an increased proportion of actinium which would, of course, mean that the precipitated rare earth would be depleted of actinium (Curie, *J. Chim. Phys.*, vol. 27, pp. 1–8 (1930)). Another process is described in U.S. Pat. No. 2,425,573 to Soddy. In this process, the rare-earth sulfates are precipitated in the presence of phosphoric acid, leaving behind in the filtrate the unwanted thorium. Thorium is one step away from actinium in the actinium decay chain. Again, the precipitated rare earth would presumably be depleted of an unwanted impurity. While these processes and others have been useful in purifying the rare earths to a certain extent, none of these processes can economically produce rare earths which are pure enough for use as phosphors in X-ray screens. There is a continuing need for an economical and efficient process for removing the radioactive impurities from the rare-earth elements.

SUMMARY OF THE INVENTION

We have found that rare-earth compositions can be highly purified by fractional precipitation of the rare earth as the sulfate, provided other precipitates are also formed. More particularly, we provide a process for purifying a composition comprising at least one rare-earth element and radioactive impurities, the process comprising the steps of:

(1) forming an aqueous solution of the composition to be purified having a pH between 4.0 and 6.5 and (2) precipitating a portion of the rare earth and the radioactive impurities by adding to the solution in an amount sufficient to effect such precipitation, while maintaining the pH between 4.0 and 6.5:
  (i) a soluble barium or strontium salt;
  (ii) a soluble aluminum, magnesium or zirconium salt;
  (iii) a selective precipitating agent; and
  (iv) a sulfate ion-providing salt.

The selective precipitating agent, in combination with the other additives, is critical to the process of the present invention. While the exact method of operation of the selective precipitating agent is not completely understood, it is believed that the rare earth, along with the aluminum, magnesium or zirconium, forms a complex precipitate with the selective precipitating agent. This precipitate is believed to act as a collector of the impurities which also precipitate from the solution. Useful selective precipitating agents are compounds or salts selected from the group consisting of:

(a) nitrogen-containing heterocyclic ring compounds having an hydroxyl group located in a $\beta$ or $\gamma$ position with respect to a nitrogen atom in the heterocyclic ring, and (b) ammonium salts of N-nitrosophenylhydroxylamines.

After the precipitate is formed, the process of the present invention is completed by two additional steps of:

(3) separating the solution from the precipitate and
(4) recovering purified rare earth from the solution.

As with any fractional precipitation process, the exact purity of the end product depends upon the molar percentage of the material which is precipitated and upon the number of precipitations. The process of the present invention is able to achieve high purities by precipitating only a small fraction of the rare earth from the solution and using only one or two precipitations. For example, if the starting rare-earth composition contains 1 part radioactive impurities in $10^{12}$, compositions having impurities in the amount of 1 part in $10^{18}$ can be prepared by the process of the present invention by precipitating about 5–15 mole percent of the rare earth from the initial solution and repeating the precipitation no more than twice. The process of the present invention therefore provides an economical and efficient method for purifying rare-earth elements.

DETAILED DESCRIPTION OF THE INVENTION

The first step in the process of the present invention is the formation of an aqueous solution of the composition of rare earth to be purified. As is known in the art, the solution can be made by dissolving the rare-earth-containing composition in an acidic solution. If the rare earth in the composition is not soluble in the acidic solution, it can be converted to a form that is acid-soluble. For example, a lanthanum-containing rare-earth composition can be fired in an oxygen atmosphere at high temperature in order to convert all of the lanthanum in the composition to lanthanum oxide, which is soluble in acid solutions. Common inorganic acids, such as hydrochloric acid, nitric acid, phosphoric acid and the like, are preferred for forming the acidic first solution. After the rare-earth composition is dissolved in the acid, the pH of this solution is adjusted to between about 4.0 to 6.5, if necessary. The optimum pH for practicing the invention will depend upon the particular rare-earth composition being purified, the solution concentration ranges and the like. The preferred range for the pH of the solution is between 5.0 and 6.0. One convenient way of maintaining the pH within the desired range is the addition of a buffering solution such as an ammonium acetate-ammonium hydroxide solution. After the first solution is formed, it is usually desirable to filter the solution to remove any insoluble material which may be present. This step is not critical and the rare-earth composition can be purified without this filtering step.

It is generally desirable to dissolve sufficient rare-earth-containing composition in the first solution in order to form a solution that is preferably about 0.88 molar in the rare earth. Because this is a fractional precipitation process, the optimum concentration of the rare earth in the starting solution is extremely sensitive to economic considerations. Useful separations can be achieved over a wide range of concentration of the rare earth in the solution. Useful concentrations range between about 0.25 molar and 1.25 molar.

In the next phase of the process of the present invention, a portion of the rare-earth element and the radioactive impurities are precipitated by adding to the solution (i) a soluble barium or strontium salt, (ii) a soluble aluminum, magnesium or zirconium salt, (iii) a selective precipitating agent and (iv) a sulfate-ion-providing salt. This precipitation phase is carried out while maintaining the pH of the solution between 4.0 and 6.5, preferably between 5.0 and 6.0. While the precipitation can be carried out by adding (i)–(iv) in any order, this precipitating phase is preferably carried out in a certain sequence of steps. First, the soluble barium or strontium salt is added to the rare-earth-containing solution. A solution of the soluble aluminum, magnesium or zirconium salt is simultaneously added with a solution of the selective precipitating agent. A precipitate is then caused to be formed by the addition of sulfate ion by adding to the solution a sulfate salt such as ammonium sulfate.

The exact rate of addition (in terms of moles additive per mole of rare earth) of each of (i)–(iv) depends on the exact nature of the rare-earth composition which is to be purified. More particularly, the exact rate of addition of these components depends upon the initial concentration of the radioactive impurities in the rare-earth composition. The rates of addition which are given below for each of these components illustrate a useful rate range for a rare-earth composition comprising about 1 part radioactive impurities in $10^{12}$ parts of rare-earth element. This concentration of radioactive impurities is a typical concentration for a relatively pure rare-earth ore. Adding these components at the indicated rate results in the precipitation of about 5–15 mole percent of the rare earth from the solution. Two precipitations will reduce the level of radioactive impurities to about 1 part in $10^{18}$. It will also be understood that, like the concentration of the rare-earth composition in the solution, the exact amount of components (i)–(iv) which are added in the precipitation phase of the process of the present invention is highly dependent upon economic factors. The optimum rate of addition for all of these components can be easily determined by routine experiment using the present disclosure as a guide.

Preferably, the first component to be added in the precipitation phase of the process of the present invention is a soluble barium or strontium salt. The salt can be added either directly or in the form of a solution. Useful soluble barium or strontium salts include any soluble salts whose anions do not interfere with the final product. Illustrative salts include halides such as barium chloride, strontium chloride, barium iodide, strontium iodide and the like; hydrates such as barium chloride dihydrate and the like. The soluble barium or strontium salt is preferably added to the solution of the rare-earth-containing composition at a rate of 0.002 to 0.01 mole/mole of rare earth. The currently preferred rate of addition of the barium or strontium salt is about 0.0033 mole/mole of rare earth. In any event, the concentration of the barium or strontium salt should be sufficiently high to insure that a major portion of the barium or strontium will be precipitated as the sulfate upon the subsequent addition of the sulfate ion and selective precipitating agent to the solution containing the dissolved rare earth. While the function of the barium or strontium salt in the precipitation is not completely understood, it is believed that the barium or strontium sulfate which forms in the precipitation acts as a seed which promotes the precipitation of the radioactive impurity radium. Alternatively, it may be that actinium is adsorbed to the surface of the precipitating barium sulfate (see, for example, McLane and Peterson, *The Transuranium Elements,* National Nuclear Energy Series, Vol 14B (1949), pages 1371–1380).

The next component to be added to the solution in the precipitating phase of the present invention is a soluble aluminum, magnesium or zirconium salt. The soluble aluminum, magnesium or zirconium salt is preferably added at the same time, i.e., substantially simultaneously, with the selective precipitating agent. Any suitable soluble aluminum, magnesium or zirconium salt can be used. For example, $Al_2(SO_4)_3 \cdot 18H_2O$, $AlCl_3 \cdot 6H_2O$, $AlBr_3 \cdot 6H_2O$, $MgSO_4$, $MgCl_2$, $MgBr_2MgI_2$ and $Zi(SO_4)_2$ can be used as the source of aluminum, magnesium or zirconium in this step. It is preferred, however, that aluminum be added as aluminum sulfate. Thus, the aluminum sulfate is both a soluble aluminum salt meeting the requirements of additive (ii) and a sulfate-ion-providing salt meeting the requirements of additive (iv). As with the barium or strontium salt, the aluminum, magnesium or zirconium salt can be added either directly or in the form of a solution. The aluminum, magnesium or zirconium salt is preferably added at a rate of 0.0005 to 0.002 moles/mole of rare earth. The currently preferred rate of addition of aluminum or magnesium salt is about 0.00077 mole/mole of rare earth. Again, the exact function of the aluminum, magnesium or zirconium in the precipitation step is not completely understood; however, it is believed that the metal ion forms a complex with the selective precipitating agent, which complex entraps or carries with it small amounts of precipitating radioactive impurity which might otherwise stay suspended in the solution.

The selective precipitating agent, in combination with the other additives, is critical to the process of the present invention. Useful selective precipitating agents are compounds and salts selected from the group consisting of (a) nitrogen-containing heterocyclic ring compounds having an hydroxyl group located in a $\beta$ or $\gamma$ position with respect to a nitrogen atom in the heterocyclic ring and (b) ammonium salts of N-nitrophenylhydroxylamines. Illustrative selective precipitating agents which are useful in the process of the present invention include:

8-hydroxyquinoline
8-hydroxyquinaldine
8-hydroxy-7-iodo-5-quinolinesulfonic acid
indoxine
kairin
5-hydroxyquinoline-8-carboxylic acid
4-hydroxybenzothiazole
2-(o-hydroxyphenyl)benzoxazole
alizarin blue
5,8-dihydroxyquinoxaline
cupferron (the ammonium salt of N-nitrosophenylhydroxylamine)

The selective precipitating agent is conveniently added in the form of a solution. The selective precipitating agent is preferably added at a rate of 0.01 to 0.03 mole/mole of rare earth. The currently preferred rate is 0.0112 mole/mole of rare earth. As with the other components in this complex precipitation phase, the exact function of the selective precipitating agent is not completely understood. It is believed that the selective precipitating agent forms a complex precipitate with a variety of the cations in the solution. It is believed that, under the conditions in which the process of the present invention is carried out, the selective precipitating agent forms a complex with the rare earth, the aluminum, magnesium or zirconium, the barium or strontium, as well as with a number of impurities. These complexes with the selective precipitating agent are believed to carry with them precipitating impurities which would otherwise be too fine to coagulate and precipitate out of the solution. While this is being offered as an explanation of the function of the selective precipitating agent and other of the components added in the precipitation phase, it is a hypothesis only, and applicants do not wish to be bound to any particular theory.

The final component to be added in the precipitation phase of the process of the present invention is a salt which provides sulfate ion. The sulfate ion is preferably added after the addition of the soluble aluminum salt and the selective precipitating agent. Addition of the sulfate-ion-providing salt is made at this time in order to form the precipitate containing a portion of the rare earth in the solution and the radioactive impurities. A wide variety of sulfate salts may be used as the source of sulfate ion. Illustrative sulfate salts include ammonium sulfate, sodium sulfate, potassium sulfate, lithium sulfate and the like. As discussed above in relation to the soluble aluminum, magnesium or zirconium salt, aluminum sulfate can also be used as at least part of the source of sulfate ion. The sulfate-ion-providing salt can be added either directly or in the form of a solution. The sulfate ion is added so that the total sulfate from this and previous additions is preferably at a rate of 0.03 to 0.15 mole/mole of rare earth. The currently preferred rate is 0.062 mole/mole of rare earth.

The precipitation phase of the process of the present invention is completed using methods well-known in the art. For example, in some instances it may be desirable to heat the solution containing precipitate to moderate temperatures, for instance, about 50° C., in order to promote the coagulation of the precipitate. After the precipitate is formed, it is separated from the solution, also using techniques which are well-known in the art. The precipitate can be allowed to settle, can be filtered, or can be centrifuged from the solution.

Depending upon the desired purity of the final rare earth, the rare earth can be recovered from the solution or the precipitation phase can be repeated. In each precipitation, it is desirable to precipitate about 5–15 mole percent of the rare earth remaining in the solution. It is preferred to precipitate amounts of rare earth on the upper end of this range in earlier precipitations and amounts on the lower end of this range in later precipitations. This provides for the most economical purification. When a solution containing rare earth of sufficient purification is obtained, the rare earth is recovered from the solution and converted to a desired form.

The purified rare earth can be recovered from the solution using methods which are well-known in the art. For example, the rare-earth solution can be first further acidified using hydrochloric acid. If an activated phosphor is the end product, an activator such as terbium can be added to the solution at this point. Adding the activator at this point insures a uniformly dispersed activator in the phosphor which will later be formed from the recovered purified rare earth. The solution is then heated while adding a stoichiometric quantity of oxalic acid to the solution to precipitate the rare earth. There is no excess oxalate ion to rare-earth ion at the end of the precipitation. The precipitate is then recovered from the solution, washed, collected, dried and can be fired in air, using known methods, to convert it to the rare-earth oxide. Preparation of the rare-earth phosphors from the oxides can be accomplished, also using well-known methods.

The degree of purification achieved for a particular rare-earth composition and a particular set of processing parameters can be determined by monitoring the radioactivity of the purified rare earth over a period of time. The radioactivity must be monitored over time because the radioactivity of the purified rare earth may vary in a somewhat unpredictable manner immediately after practicing the process of the present invention. For practical purposes, the equilibrium state is reached in about 100 days. The reason for this unpredictable variability immediately after processing appears to be that the purification process of the present invention disturbs the equilibrium which ordinarily exists in the relative proportions of the elements in the radioactive decay chains.

In the following examples, the removal of radioactive impurities from the rare earth was measured using a γ-ray counting system. For each sample, the ratio of the counts for a particular radioactive impurity in the sample to the counts for lanthanum (138) in the sample was determined. Lanthanum (138) is a naturally occurring radioactive isotope of lanthanum. Unfortunately, the radioactive impurity of primary concern, actinium(227), gives very low counts compared with other radioactive members of its decay chain. The effectiveness of the removal of actinium(227) must therefore be determined by measuring the removal of a member of its decay chain after the sample has come to equilibrium.

The γ-ray counting system used in the following examples included a lead-shielded detector, an amplifier, an analyzer, a printer and a recorder. The detector used was a 60-cc Canberra Model 7219 lithium-doped germanium γ-ray detector. Signals from the detector were routed through an amplifier, then fed into a multi-channel analyzer where the data could be stored as a pulse height spectrum. A printer was used for data printout and, by connection to a X-Y recorder, graphical representations of the data could be made.

In the following examples, the starting material was lanthanum oxide. Samples were tested before processing and at various intervals thereafter, as indicated in the examples and tables. For testing, equal-weight samples were placed in polyethylene bags and sealed. The bags were placed in a sample holder directly in contact with the front face of the detector, and the γ-rays emitted were counted for several hours.

Radioactive emissions from the rare-earth oxides have been found to correlate well with the number of high-density spots which can be expected using X-ray screens made from phosphors which in turn are made from these rare-earth oxides. Thus, it has been found that, when the radioactive emissions from a particular sample of lanthanum oxide is low, a terbium-activated lanthanum oxysulfide phosphor made from this lanthanum oxide can be used in a screen which exhibits very low incidence of high-density spots.

The following examples illustrate the practice of the invention.

EXAMPLE 1

In a solution containing 1000 mL of water and 330 mL of concentrated hydrochloric acid solution (37.5% by weight) were dissolved 200 g of lanthanum oxide. To the solution were added 78.0 g of ammonium acetate to bring the pH to about 5.5. To the solution was added 1.0 g of barium chloride dihydrate.

To the solution containing the dissolved lanthanum were added 10 mL of an aqueous solution containing 15.4 g of aluminum sulfate in 250 mL of water, and 50 mL of a solution of 4.0 g of 8-hydroxyquinoline in 100 mL of ethyl alcohol. Then 100 mL of an aqueous solution containing 10 g of ammonium sulfate were added to the solution containing the dissolved lanthanum.

The resulting suspension was heated to approximately 50° C. for 0.5 h to coagulate the precipitate. After additional stirring to insure complete precipitation, the precipitate was permitted to settle for 16 h at room temperature. The supernatant solution containing a purified lanthanum was then separated from the precipitate by filtering through a 0.45μ HAWP Millipore filter.

Barium chloride dihydrate (1.0 g) was added to the filtrate solution, and the precipitation process steps described above were repeated.

The filtrate solution containing the twice-purified lanthanum was acidified, using 200 mL of hydrochloric acid (37.5% by weight). Then a stoichiometric amount of oxalic acid in 1000 mL water was slowly added to the heated lanthanum solution (approximately 70° C.), resulting in a lanthanum oxalate precipitate. The precipitate was recovered by filtering the suspension using a sintered glass crucible of coarse porosity. The precipitate was washed with 3 liters of distilled water, dried and then heated in air to convert it to 150 g of lanthanum oxide (85% yield).

The purified lanthanum oxide was then compared with the original untreated starting material for the presence of radioactive impurities, by the methods previously described. The results, shown in Table 1, indicate that the process of the invention achieves significant reductions of radioactive impurities in rare-earth compositions.

TABLE I

| Sample | Isotope and Energy Emission Value Ratio of Isotope/Lanthanum (138) | | | | | |
|---|---|---|---|---|---|---|
| | $211_{Bi}$ 351 KEV | % of orig. level | $219_{Rn}$ & $223_{Ra}$ 272 KEV | % of orig. level | $227_{Th}$ 256 KEV | % of orig. level |
| 1. La$_2$O$_3$, untreated | .057 | | .12 | | .027 | |
| 2. La$_2$O$_3$, purified initially | | | | | | |
| plus 12 days | <.006 | <(11%) | <.009 | <(8%) | <.006 | <(22%) |
| plus 24 days | <.007 | <(12%) | <.020 | <(17%) | <.008 | <(30%) |
| at equilibrium (120 days) | .026 | (46%) | .036 | (30%) | <.009 | <(33%) |

EXAMPLE 2

In a solution containing 1250 mL of water and 165 mL of concentrated hydrochloric acid solution (37.5% by weight) were added 100 g of lanthanum oxide. In the solution were dissolved 60 g of ammonium acetate, and ammonium hydroxide was added to adjust the pH of the solution to 5.5. To the solution was added 1.0 g of barium chloride.

The following solutions were then successively added to the solution containing the dissolved lanthanum: 50 mL of an aqueous solution containing 5.0 g of ammonium sulfate; 10.0 mL of a 0.095 molar aluminum sulfate solution; 25 mL of an aqueous solution containing 0.6 g of zirconium sulfate. Then 75 mL of an ethyl alcohol solution containing 3.0 g of 8-hydroxyquinoline and 0.75 g of cupferron were added to the solution containing the dissolved lanthanum while stirring.

The resulting suspension was heated to approximately 50° C. for at least an hour to coagulate the precipitate. After settling of the precipitate, the supernatant solution containing purified lanthanum was separated from the precipitate by filtering through a 0.45μ Millipore filter.

An aqueous solution containing 115.5 g of an oxalic acid solution was then added to the filtrate solution to precipitate the purified lanthanum. The resulting lanthanum oxalate precipitate was separated from the solution by filtering through a sintered glass crucible of coarse porosity. The precipitate was washed with 3 liters of distilled water, dried, and then heated in air to convert it to 95 g of lanthanum oxide (95% yield).

The purified lanthanum oxide was then compared with the original untreated starting material for the presence of radioactive impurities, by the methods previously described. The results, shown in Table 2, again indicate that the process of the invention achieves significant reductions of radioactive impurities in rare earth compositions.

TABLE 2

| | Isotope and Energy Emission Value Ratio of Isotope/Lanthanum (138) | | |
|---|---|---|---|
| Sample | $211_{Bi}$ 351 KEV | $219_{Rn}$ & $223_{Ra}$ 272 KEV | $227_{Th}$ 256 KEV |
| 1. La$_2$O$_3$, untreated | 0.04 | 0.08 | 23 <0.02 |
| 2. La$_2$O$_3$, purified at equilibrium (106 days) | ≦0.015 | 0.019 | ≦0.009 |

The invention has been described in detail with particular reference to certain preferred embodiments, but it will be understood that varifications and modifications can be effected within the spirit and scope of the invention.

We claim:

1. A process for purifying a composition comprising at least one rare-earth element and at least one acid-soluble radioactive impurity of the actinium decay chain, said process comprising the steps of:
   (1) forming an aqueous solution of said composition having a pH between 4 and 6.5;
   (2) precipitating a portion of said rare earth and said radioactive impurity by adding to said solution in an amount sufficient to effect such precipitation and while maintaining the pH between 4.0 and 6.5;
      (i) a soluble barium or strontium salt;
      (ii) a soluble aluminum, magnesium or zirconium salt;
      (iii) a sulfate ion-providing salt; and
      (iv) a selective precipitating agent consisting of a compound or salt selected from the group consisting of:
         (a) nitrogen-containing heterocyclic ring compounds having an hydroxyl group located in a β or γ position with respect to a nitrogen atom in the heterocyclic ring and
         (b) ammonium salts of N-nitrophenylhydroxylamines;
   (3) separating the solution from the precipitate; and
   (4) recovering purified rare earth from the solution.

2. A process according to claim 1 wherein said composition contains lanthanum.

3. A process according to claim 1 wherein said solution is maintained at a pH between 5.0 and 6.0.

4. A process according to claim 1 wherein said selective precipitating agent is an 8-hydroxyquinoline derivative.

5. A process according to claim 1 wherein said selective precipitating agent is 8-hydroxyquinoline.

6. A process according to claim 1 wherein said solution is between 0.25 and 1.25 molar in said rare earth and:
   (i) said soluble barium or strontium salt is present from 0.002 to 0.01 mole/mole of rare earth;
   (ii) said soluble aluminum salt is present from 0.0005 to 0.002 mole/mole of rare earth;
   (iii) said sulfate ion-providing salt is present from 0.03 to 0.15 mole/mole of rare earth; and
   (iv) said selective precipitating agent is present from 0.01 to 0.03 mole/mole of rare earth.

7. A process for purifying a composition comprising lanthanum and at least one acid-soluble radioactive impurity of the actinium decay chain, said process comprising the steps of:
   (1) forming a first aqueous solution of said composition by dissolving said composition in a hydrochloric acid solution so as to form a solution which is between 0.25 to 1.25 molar in said lanthanum;
   (2) adjusting the pH of said first solution by adding ammonium acetate and sufficient ammonium hydroxide to bring the pH to between 5.0 and 6.0;
   (3) adding barium chloride dihydrate at a rate of about 0.0033 moles/mole of rare earth in said first solution;
   (4) simultaneously adding:
      (i) a 0.095 molar solution of aluminum sulfate so that the rate of addition is about 0.00077 moles/mole of rare earth in said first solution and
      (ii) a 0.275 molar solution of 8-hydroxyquinoline so that the rate of addition is about 0.0112 moles/mole of rare earth in said first solution;
   (5) adding a 0.757 molar solution of ammonium sulfate so that the rate of addition is about 0.062 moles/mole of rare earth in said first solution, thereby precipitating a portion of said lanthanum and said impurity;
   (6) coagulating and separating said precipitate from said solution;
   (7) repeating steps (3)–(6); and
   (8) recovering purified lanthanum from said solution.

* * * * *